United States Patent
Yokoyama et al.

(10) Patent No.: US 7,665,765 B2
(45) Date of Patent: Feb. 23, 2010

(54) AIR-BAG AND METHOD OF FOLDING THE SAME

(75) Inventors: Aki Yokoyama, Shizuoka (JP); Tomoko Ninomiya, Shizuoka (JP); Yukihiro Naitou, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 231 days.

(21) Appl. No.: 11/583,909

(22) Filed: Oct. 20, 2006

(65) Prior Publication Data
US 2007/0096448 A1    May 3, 2007

(30) Foreign Application Priority Data
Oct. 21, 2005    (JP)    ............... 2005-307718

(51) Int. Cl.
*B60R 21/237*    (2006.01)
(52) U.S. Cl. ................... 280/743.1
(58) Field of Classification Search ............. 280/728.1, 280/743.1; 493/405, 407, 408, 451, 458, 493/464
See application file for complete search history.

(56) References Cited

U.S. PATENT DOCUMENTS

| | | | |
|---|---|---|---|
| 6,170,870 B1 | 1/2001 | Marotzke et al. | |
| 6,176,509 B1 * | 1/2001 | Kawaguchi et al. | ...... 280/728.1 |
| 6,224,100 B1 | 5/2001 | Kamano et al. | |
| 6,250,675 B1 | 6/2001 | Dietsch et al. | |
| 6,406,061 B1 * | 6/2002 | Nishijima et al. | ......... 280/743.1 |
| 6,485,403 B2 * | 11/2002 | Kamano et al. | ............. 493/457 |
| 6,595,548 B2 * | 7/2003 | Kamano et al. | .......... 280/743.1 |
| 6,726,615 B1 | 4/2004 | Lang et al. | |
| 6,994,664 B2 * | 2/2006 | Nishijima et al. | ............ 493/449 |
| 2002/0053791 A1 * | 5/2002 | Nishijima et al. | ......... 280/743.1 |
| 2003/0171200 A1 | 9/2003 | Nishijima et al. | |
| 2004/0160048 A1 * | 8/2004 | Hasebe et al. | ............ 280/743.1 |

FOREIGN PATENT DOCUMENTS

| | | |
|---|---|---|
| EP | 0829396 A1 | 3/1998 |
| JP | 10-129381 A | 5/1998 |
| JP | 2000-501354 A | 2/2000 |
| JP | 3579702 B2 | 7/2004 |
| WO | WO 97/35745 A1 | 10/1997 |
| WO | WO 01/76917 A1 | 10/2001 |

\* cited by examiner

*Primary Examiner*—Ruth Ilan
(74) *Attorney, Agent, or Firm*—Sughrue Mion, PLLC (57) ABSTRACT

An air bag 12 is spread flatly. Along four lines "R" that extend radially outward, the air bag 12 is sandwiched and held by line part forming units. By using a first press pieces 44, a portion between the neighboring lines "R" is pressed toward the gas inlet opening to form a first gathering portion, and form a ear portion 52 along each line "R". Then, each ear portion 52 is pressed by a second press piece 45 to form a second gathering portion 54 that is like a bellows. When a gas is introduced into the gas inlet opening 26, the second gathering portion 54 is quickly expanded and increase of internal pressure of the air bag can be controlled. In the folding process, there is no need of turning the air bag 12 and thus a production device can be made simple in construction.

13 Claims, 6 Drawing Sheets

AIR-BAG AND METHOD OF FOLDING THE SAME

TECHNICAL FIELD

The present invention relates to both a method of folding an air bag that is expanded when fed with a gas and the air bag itself. The present invention is applicable to an air bag device that is mounted to an automotive steering wheel or the like.

BACKGROUND OF THE INVENTION

Hitherto, an air bag device mounted to an automotive steering wheel has been widely used. The air bag device comprises a flat bag-shaped air bag, a cover member that covers the air bag and an inflator that feeds the air bag with a gas. Usually, with the aid of a given folding method, the air bag is kept folded small in the cover member. Upon sensing a shock of collision by a sensor, the inflator ejects a gas to expand the air bag and breaks the cover member with the pressure of the air bag expansion thereby projecting the expanded air bag from the broken cover member and placing the expanded air bag in front of a passenger to absorb the shock applied to the passenger.

Nowadays, methods of folding an air bag that assure improved expansion characteristic, automatic production and reduction in production cost have been seriously pursued.

For example, as a method of folding an air bag for a driver that shows a circular shape when spread flat, a method is known which comprises forming narrow portions of the air bag with the aid of four sword-like tools, and then shrinking the air bag by using a slider for folding the air bag disorderly (see for example Patent Reference 1). In this method, the narrow portions of air bag that are shrunken by the slider are folded without proper mating and thus, upon expansion of the air bag, the narrow portions are suppressed from mutual interference, which is an advantageous effect. However, since the portions that are shrunken by the slider are folded disorderly from the radially outer side, the inflation gas fed from a center portion is not smoothly led to a peripheral portion of the air bag, which makes it difficult to quickly expand the peripheral portion of the air bag.

Another method is also known which comprises shrinking the air bag to its inside by using a plurality of plate like sliders (see for example Patent Reference 2). However, in this method, like in the above-mentioned Patent Reference 1, the gas fed from the center portion fails to smoothly and quickly reach the peripheral portion of the air bag. Furthermore, due to usage of the plurality of sliders, the construction is complicated and the production cost is increased.

Still another method is known which comprises after folding the air bag like an accordion, bending the folded air bag (see for example Patent Reference 3). However, in this reference, an automatic folding method suitable for the accordion like folding and the bending method for the folded air bag are not well described. Furthermore, when the air bag is folded like an accordion, that is, when the air bag is so folded that throughout entire construction of the air bag, a plurality of portions of the air bag are folded in one direction along respective parallel lines, it occurs that the air bag shows a high tendency in expanding direction when expanded, and thus, it is difficult to provide the air bag with a desired expanding characteristic.

In view of the above, a method has been proposed which comprises providing the air bag with radially projecting ear-shaped margin portions, gathering portions between the margin portions at a center portion of the air bag, turning the air bag while folding the same and putting the margin portions along the gathered portions (see for example Patent Reference 4 and Patent Reference 5). In this method, the gas is smoothly supplied to a peripheral portion of the air bag along the margin portions, and thus, smooth and quick expansion to the peripheral portion is assuredly achieved. However, in this method, for turning the air bag that is under the folding process, it is necessary to provide a production device and thus production cost is increased.

Patent Reference 1: Tokuhyo 2000-501354 (FIGS. 9 to 11)
Patent Reference 2: Tokkaihei 10-129381 (FIGS. 3 and 4)
Patent Reference 3: Tokkyo 3579702 (FIGS. 1, 2 and 5)
Patent Reference 4: Kokusai Koukai 97/35745 pamphlet (FIG. 44)
Patent Reference 5: Kokusai Koukai 2001/076917 pamphlet (FIGS. 9, 10 and 13)

DISCLOSURE OF THE INVENTION

Problems to be Solved by the Invention

As is described hereinabove, in the conventional method in which folding of the air bag is carried out by pressing given portions of an air bag toward a center portion of the air bag, desired expansion characteristic of the air bag is not easily obtained.

In the method that comprises providing the air bag with radially projecting ear-shaped margin portions, gathering portions between the margin portions at a center portion of the air bag, turning the air bag while folding the same and putting the margin portions along the gathered portions, the gas is smoothly supplied to the peripheral portion of the air bag along the margin portions and thus smoothed and quick expansion to the peripheral portion is achieved. However, in this method, for turning the air bag that is under the folding process, a production device for such purpose is needed and thus production cost is increased.

The present invention is provided by taking the above-mentioned various things into consideration and aims to provide an air bag folding method and an air bag itself, which assure an improved expansion characteristic of the air bag and reduction in production cost.

Means for Solving the Problems

A method of folding an air bag which includes a first surface portion that has a gas inlet opening and a second surface portion that is arranged to be opposite to the first surface portion, the method comprising a regulating process wherein along a plurality lines extending to the gas inlet opening, the first and second surface portions are moved closer, a first gathering process wherein portions positioned between the lines are pressed toward the gas inlet opening to form a first gathering portion, and a second gathering process wherein after completion of the first gathering process, the regulated portions that have been moved closer to each other are pressed toward the gas inlet opening to form a gathering portion around the first gathering portion thereby to form a second gathering portion.

In this air bag folding method, there is no need of using a process wherein the air bag is gradually folded up from its end portion as well as a process wherein the air bag is turned while it is under folding. That is, in this air bag folding method, the air bag can be folded up by combining simple forward and rearward motions, and thus, an air bag folding device used for folding the air bag can be made simple in construction and thus production cost can be reduced. Furthermore, upon starting of expansion of the air bag that has been kept flat, the inflation gas introduced from the gas inlet opening is instantly led to the outer peripheral portion of the second gathering portion through the regulated portions that have been formed like line-shaped passages at the regulating process. Furthermore, since the second gathering portion is provided around the first gathering portion, the second gathering portion is instantly expanded in radial directions along the lines first and then the first gathering portion is expanded. Like this manner, the air bag can be instantly and stably expanded in desired directions.

A method of folding an air bag which includes a first surface portion that has a gas inlet opening and a second surface portion that is arranged to be opposite to the first surface portion, the method comprising a regulating process wherein along a plurality of lines extending to the gas inlet opening, the first and second surface portions are moved closer, a first pressing process wherein portions defined between the lines are pressed toward the gas inlet opening, and a second pressing process wherein after completion of the first pressing process, the regulated portions that haven been moved closer to each other are pressed toward the gas inlet opening thereby to form a bellow-shaped flat gathering portion.

In this air bag folding method, there is no need of using a process wherein the air bag is gradually folded up from its end portion as well as a process wherein the air bag is turned while it is under folding. That is, in this air bag folding method, the air bag can be folded up by combining simple forward and rearward motions, and thus, an air bag folding device used for folding the air bag can be made simple in construction and thus production cost can be reduced. Furthermore, upon starting of expansion of the air bag that has been kept flat, the inflation gas introduced from the gas inlet opening is instantly led to the outer peripheral portion of the air bag through the regulated portions that have been formed like line-shaped passages at the regulating process, so that the bellow-shaped folded portion can be instantly expanded in radial directions along the lines, and thus, the air bag can be instantly and stably expanded in desired directions.

An air bag that comprises a first surface portion that has a gas inlet opening, a second surface portion that is arranged to be opposite to the first surface portion, a plurality of first gathering portions that are gathered around the gas inlet opening in such a manner as not to touch one another through a plurality of imaginary lines that extend from the gas inlet opening to a peripheral portion of the air bag, and a plurality of second gathering portions in which at a portion where the imaginary lines extend, the first surface portion and the second surface portion face each other without touching each other and a portion including the portion extending along the imaginary lines is gathered around the first gathering portion.

In this arrangement, upon starting of expansion of the air bag that has been folded flat, the inflation gas introduced from the gas inlet opening is instantly led to the peripheral portion of the second gathering portion through the portions that extend along the imaginary lines, and since the second gathering portion is placed around the first gathering portion, the second gathering portion is instantly expanded in radial directions along the imaginary lines and then the first gathering portion is expanded. Like this manner, the air bag is instantly and smoothly expanded in desired directions. Furthermore, in an air bag folding process, there is no need of using a process wherein the air bag is gradually folded up from its end portion as well as a process wherein the air bag is turned while it is under folding. That is, in this air bag folding process, the air bag can be folded up by combining simple forward and rearward motions, and thus, an air bag folding device used for folding the air bag can be made simple in construction and thus production cost can be reduced.

An air bag that comprises a first surface portion that has a gas inlet opening, a second surface portion that is arranged to be opposite to the first surface portion and an arrangement wherein at a portion where imaginary lines extend from the gas inlet opening to an outer peripheral portion of the air bag, the first and second surface portions face each other without touching each other and a portion including the portion extending along the imaginary lines is gathered without touching each other thereby constitute a bellow-shaped gathering portion.

In this arrangement, upon starting of expansion of the air bag, the inflation gas introduced from the gas inlet opening is instantly led to the peripheral portion of the gathering portion through the portions of the imaginary lines, and since the gathering portion has a bellow-shaped construction, the gathering portion can be instantly or rapidly expanded in radial directions along the imaginary lines. Like this manner, the air bag can be instantly and stably expanded in desired directions. Furthermore, in an air bag folding process, there is no need of using a process wherein the air bag is gradually folded up from its end portion as well as a process wherein the air bag is turned while it is under folding. That is, in this air bag folding process, the air bag can be folded up by combining simple forward and rearward motions, and thus, an air bag folding device used for folding the air bag can be made simple in construction and thus production cost can be reduced.

An air bag as above that further has a feature wherein the first and second surface portions are folded toward the gas inlet opening without touching each other thereby to form a bellow-shaped flat gathering portion around the gas inlet opening.

In this arrangement, upon starting of expansion of the air bag, the inflation gas introduced from the gas inlet opening is instantly led to the peripheral portions of the first and second surface portions through the portions that are not mated, and thus, instant expansion toward the peripheral portion of the air bag is achieved.

An air bag as above that has further a feature wherein the second surface portion has a substantially single layer at a portion that corresponds to a portion of the first surface portion where the gas inlet opening is provided.

In this arrangement, in an initial stage of expansion of the air bag, an instant expansion of a given dimension is carried out at a front side of the air bag, so that it is possible to instantly break the member covering the air bag, and in a subsequent expansion stage, the expansion at the front side is restricted, and the folded portion is expanded toward the outside, which is a desired expansion process of the air bag.

An air bag as above that further comprises a circular first cloth that constitutes the first surface portion and has the gas inlet opening, a circular second cloth that constitutes the second surface portion, a third cloth that is arranged between the first and second cloths in a manner to cover the gas inlet opening, a plurality of connecting portions by which the third cloth is connected to the first cloth and gas guiding portions that are each defined between neighboring two connecting portions to guide the inflation gas from the gas inlet opening along imaginary lines.

In this arrangement, the inflation gas from the gas inlet opening can be smoothly guided to the portions along the imaginary lines with a simple construction, so that the expansion at the initial stage is restricted inducing an advantageous flat expansion of the air bag, which is a desirable expansion characteristic of the air bag.

ADVANTAGEOUS EFFECTS OF THE INVENTION

According to the present invention, there is provided an air bag that can be produced at a lower cost and foldable in a manner to show a desirable expansion characteristic upon expansion.

DETAILED DESCRIPTION OF THE EMBODIMENTS

In the following, an air bag folding method and an air bag itself, which are embodiments of the present invention, will be described in detail with reference to the accompanying drawings.

Figure 3:
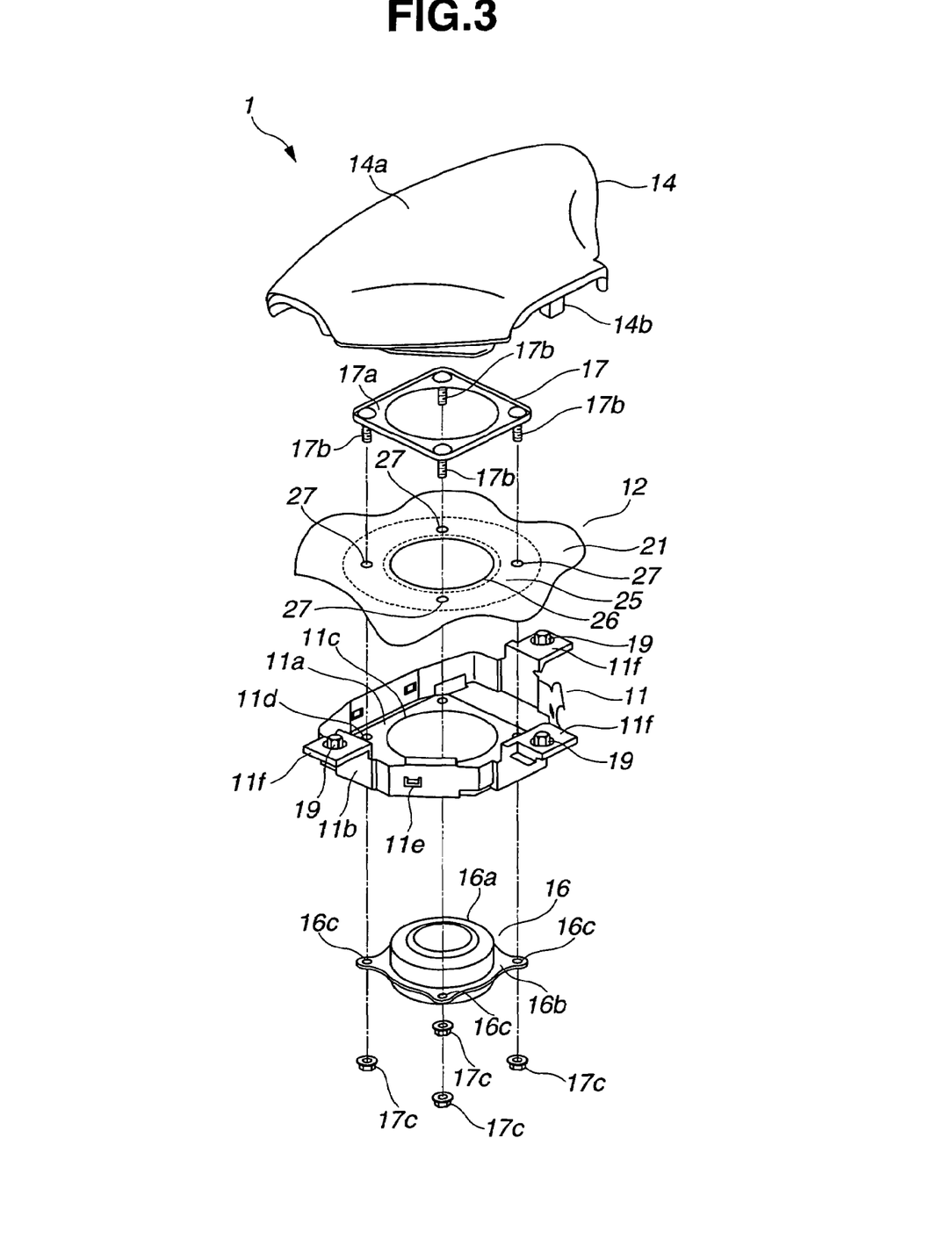
FIG. 3 is an exploded view of a part of an air bag device that is equipped with the air bag according to the present invention.

In FIG. 3, denoted by numeral 1 is an air bag device. The air bag device 1 is mounted to a boss portion of a steering wheel proper of an automotive steering wheel to expand between a passenger, viz., driver and the steering wheel to protect the passenger from a shock caused by a collision. Usually, the steering wheel is inclined, and some of the steering wheels are of a type that permits a tilting movement. In the following description, a front side of the air bag of the air bag device 1 that faces a passenger will be called an upper side, and a bottom side of the air bag of the air bag device 1 that faces a vehicle body will be called a lower side, and a front upper side of a vehicle, that is, the portion of a windshield will be called a front side portion and a rear lower portion of the vehicle will be called a rear side portion. Although not shown in the drawings, the steering wheel comprises an annular rim portion, a boss portion placed within the rim portion and spoke portions connecting the rim portion and boss portion. In a steering wheel having three or four spoke portions, two spoke portions are arranged at both sides of the boss portion and one or two remaining boss portions are arranged at a back side of the boss portion, and between a front side of the boss portion and the rim portion, there is defined a larger window space through which various meters of the vehicle are viewed by the driver.

The air bag device 1 comprises a metal base plate 11 that is to be secured to the steering wheel proper, a flat bag-shaped air bag 12 that is folded on the base plate 11, a cover member 14 that covers the air bag 12 and is secured to the base plate 11, an inflator 16 that is mounted to a lower side of the base plate 11 to feed the air bag 12 with an inflation gas, and a retainer 17 that connects the air bag 12 and the inflator 16 to the base plate 11.

The base plate 11 comprises a base plate portion 11a, a side plate portion 11b that projects upward from a peripheral portion of the base plate portion 11a. In the base plate portion 11a, there are provided an inflator inserting aperture 11c and mounting openings 11d that are arranged to surround the inflator inserting bore 11c. To the side plate portion 11b, there are provided cover member fixing portions 11e by which the cover member 14 is fixed to the base plate 11. From upper portions of the side plate portion 11b, there are projected supporting portions 11f that have horn switches mounted thereon.

The cover member 14 comprises a cover portion 14a that covers the boss portion of the steering wheel and part of the spoke portions and a mounting wall portion 14b that projects downward from a bottom surface of the cover portion 14a, and the cover member 14 is constructed of a plastic molded through injection molding technique. The cover portion 14a is formed with a portion of tear line that is weaker in toughness than the other surrounding portion.

The inflator 16 comprises a cylindrical body portion 16a and a flange portion 16b that projects outward from a cylindrical outer surface of the body portion 16a. Within the body portion 16a, there are installed a propellant that produces a gas upon reaction and an igniter (squib) that ignites the propellant. The body portion 16a is formed, at its outer cylindrical wall above the flange 16b, with a plurality of gas injection openings that are arranged at given spaced intervals. In the illustrated embodiment, the inflator 16 is of a dual type that is constructed to control the gas pressure into two power modes, which are 130 kPa and 180 kPa. Four corners of the flange portion 16b are formed with circular mounting openings 16c respectively.

Figure 2:
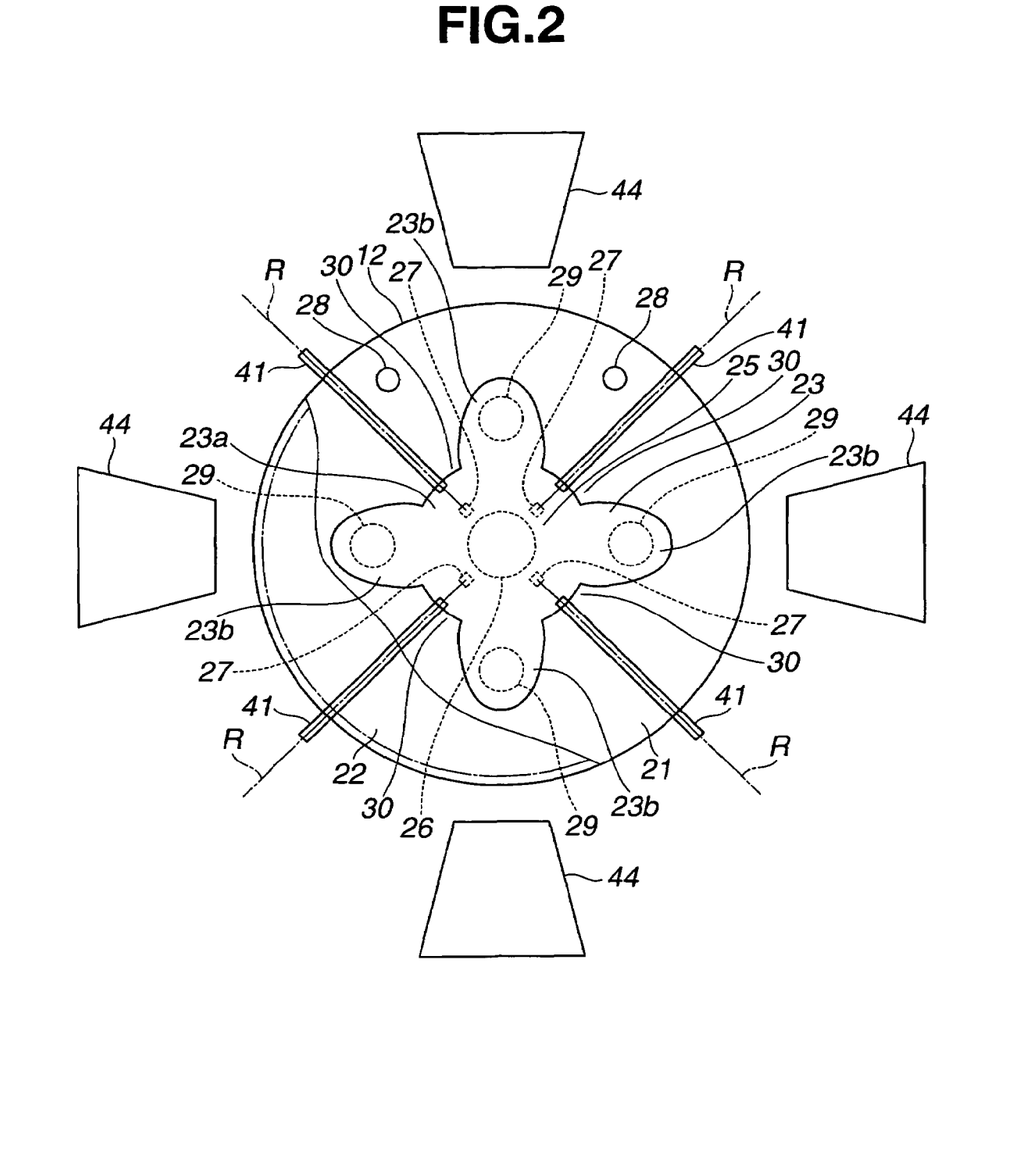
FIG. 2 is an illustration showing a folding process of the air bag.

As is seen from FIGS. 2 and 3, the air bag 12 comprises a first cloth 21 that is a lower side cloth having a first surface portion, a second cloth 22 that is an upper side cloth put on the first cloth 21 and has a second surface portion, and a third cloth 23 that is an intermediate cloth arranged between the first and second cloths 21 and 22. These cloths 21, 22 and 23 are of a type that has a given strength, a given flexibility, a given gastightness and a given heat resiliency. For example, these cloths may be made of a cloth of NYLON (trade name) coated with a suitable material. The first and second cloths 21 and 22 are circle in shape and the same in size, and have their peripheral portions stitched, so that when spread, they show a circular disc shape and when expanded, they show a compressed globe like shape having for example 60 litters in capacity. That is, they constitute an outer shell member of the air bag 12 for a driver's seat. A center portion of the first cloth 21 constitutes a bottom surface portion 25 that is formed at its center area with a circular inlet opening 26 and is formed around the circular inlet opening 26 with four circular connecting openings 27. Furthermore, the first cloth 21 is formed, at two portions near its front peripheral portion, with two circular discharge openings (ventilation holes) 28. The second cloth 22 has an front surface portion that is an upper surface facing the inlet opening 26. While, the third cloth 23 comprises a circular center portion 23a and four radially projected portions 23b that project radially outward from the circular center portion 23a. The third cloth 23 is put on the inner center portion of the first cloth 21 in such a manner that the center portion 23a covers the bottom surface portion 25 that has the inlet opening 26 and the projected portions 23b are connected to the first cloth 21 through circular stitched connecting portions 29 provided therebetween. Each projected portion 23b extends forward, rearward, rightward and leftward, and each space defined between neighboring two projected portions 23b constitutes a gas guide portion 30.

That is, the inflation gas from an area near the inlet opening 26 is guided by the third cloth 23, directed toward the peripheral portion through the gas guide portions 30, and turned back at the peripheral portion to flow back toward the front surface side, so that the air bag 12 constitutes a so-called 2.5 layers type air bag that exhibits a certain gas flow control. Each gas discharge opening 28 is arranged to be exposed to the gas guide portion 30. Although not shown in the drawings, besides the first, second and third cloths 21, 22 and 23, the air bag 12 has reinforcing overlapped cloths stitched thereto which are for example flametight cloths or the like.

The retainer 17 comprises a retainer proper 17a that is made of a metal and has an annular shape, and four connecting bolts 17b that project from the retainer proper 17a. Each connecting bolt 17b has a nut 17c meshed therewith.

For assembling the air bag device 1, the retainer 17 is inserted into the air bag 12 and, with the connecting bolts 17b kept inserted in the connecting openings 27 of the air bag 12, the air bag 12 is folded up in such a manner as will be described hereinafter, and by inserting the connecting bolts 17b into the connecting openings 11d of the base plate 11, the inlet opening 26 becomes positioned to the inflator inserting aperture 11c thereby to establish arrangement of the air bag 12. Then, the body portion 16a of the inflator 16 is inserted into the air bag 11 through the inlet opening 26 and the inflator inserting aperture 11c, and the connecting bolts 17b are inserted into the connecting openings 16c and the nuts 17c are engaged with the connecting bolts 16c and turned in a tightening direction, resulting in that the air bag 12 and the inflator 16 are fixed to the base plate 11. Then, with the cover member 14 covering the folded air bag 12, the mounting wall portion 14b of the cover member 14 is moved down and brought into engagement with the side plate portion 11b of the base plate 11 to establish a fixed connection between the mounting wall portion 14b and the cover member fixing portions 11e. If desired, rivets may be used for achieving the fixed connection. With such steps, the air bag device 1 is assembled.

Upon a vehicle collision or the like, the air bag device 1 energizes the igniter of the inflator 16 by receiving a signal from a control device (not shown) and actuates the charged propellant, resulting in that the inflation gas is rapidly supplied from a gas injection opening of the inflator 16 to the interior of the air bag 12. With this, the air bag 12 is rapidly expanded, and with an operation of the expansion pressure, the tear line of the cover member 14 becomes broken thereby to produce an exit opening for the air bag 12. The air bag 12 thus projected from the cover member 14 through the broken tear line is further expanded in front of the passenger and allowed to restrain the passenger who is forced to incline forward thereby protecting the passenger from the shock of the collision.

In the following, a method for folding the air bag 12 will be described with reference to FIGS. 1 and 2.

Although not shown in the drawings, a folding device used for folding the air bag comprises a horizontal mounting plate portion and a height control portion that is vertically movable relative to the mounting plate portion. At a center portion of the mounting plate portion, there is provided a holding portion that holds the retainer 17 connected to the air bag 12. Along radial lines "R" that extend radially outward from the holding portion, there are provided at least three or preferably four line part forming units 41. Each line part forming unit 41 comprises a pair of stopper plates that extend along the line "R" while facing each other in a vertical direction. These stopper plates are arranged to move vertically without interference with the horizontal mounting plate portion and the height control portion.

The folding device comprises a plurality of first press pieces 44 and a plurality of second press pieces 45 that are movable forward and rearward on the horizontal mounting plate portion toward and away from the center side holding portion of the mounting plate portion. In accordance with the number of the line part forming units 41, the first and second press pieces 44 and 45 are four in number respectively. Each first press piece 44 is arranged to move along a radial zone that is defined between the mutually neighboring line part forming units 41, and each second press piece 45 is arranged to move along the line part forming unit 41, that is, along the line "R". The press pieces 44 and 45 are of a block member having a trapezoidal plan view, and each press piece 44 or 45 has, at its side facing the center side holding portion, a press surface that is flat.

The folding device is further equipped with a control means that controls an entire operation of the folding device in accordance with a predetermined program and cylinders and the like that actuate various portions in accordance with the control by the control means.

The folding process will be described in the following. First, the height control portion is moved up to an inoperative position permitting upward and downward escaping movement of the stopper plates of the line part forming units 41, and as is shown in FIG. 2, with the pressing pieces 44 and 45 taking radially outside escaping positions, the retainer 17 of the air bag 12 is held by the holding portion and the air bag 12 is spread flatly on the horizontal mounting plate portion. It is to be noted that in FIGS. 1 and 2, the retainer 17 is not shown.

Then, the height control portion is moved downward to a position that is away from the holding position by a predetermined distance, and the stopper plates that face each other at the upper and lower position of the line part forming units 41 are moved toward each other thereby to sandwich therebetween the air bag 12 along the lines "R".

Figure 1A:
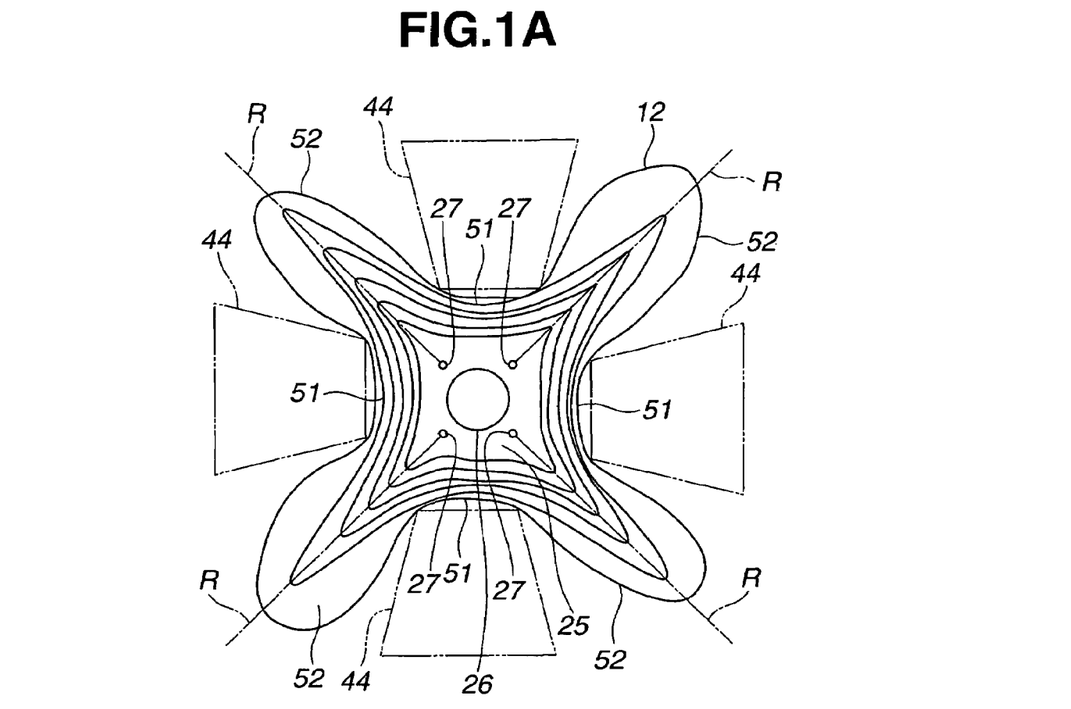
FIG. 1 shows illustrations showing a folding process of an air bag according to the present invention.

Then, the first press pieces 44 are advanced toward the center side at a predetermined speed. With this, as is seen from FIG. 1(a), portions of the air bag that have been pressed by the pressing surfaces of the first press pieces 44 are folded up around the inlet opening 26, viz., around the retainer 17 thereby to constitute first bellow-shaped gathering portions 51 permitting the portions of the air bag sandwiched by the line part forming units 41 to form ear-shaped margin portions 52. In this process, by moving the first press pieces 44 at the predetermined speed, the air bag 12 is subjected to a slight expansion due to the work of small air that is left in the flatly spread air bag 12, and thus, the first and second cloths 21 and 22, more specifically, the first cloth 21, the third cloth 23 and the second cloth 22 are folded up respectively like a bellow without meshing with one another.

Figure 1B:
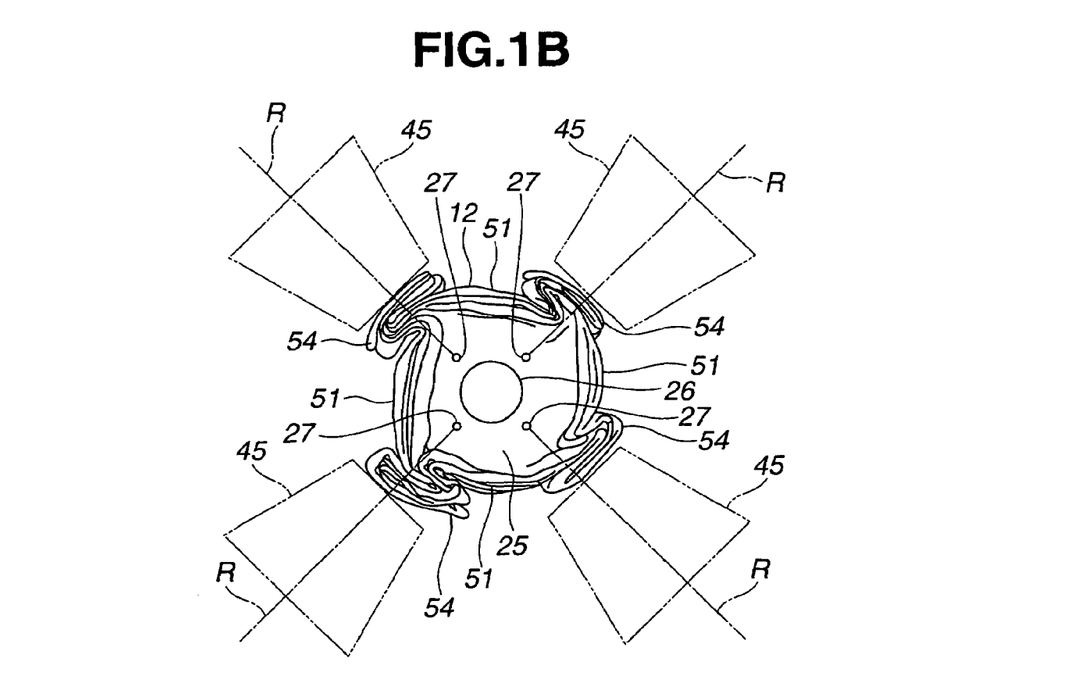

Then, the stopper plates of the line part forming units 41 are moved upward and downward to their withdrawn positions permitting a radially outward movement of the first gathering portions 51 and then the second press pieces 45 are advanced toward the center side. With this, as is shown in FIG. 1(b), the ear-shaped margin portions 52 are pressed by the press surfaces of the second press pieces 45, so that the ear-shaped margin portions 52 are folded up like a bellow on outer surfaces of the first gathering portions 51 thereby forming a second gathering portion 54. The line along which of the pleats of each bellow-shaped second gathering portion 54 are folded extends vertically, that is, in a direction that is perpendicular to the line along which the pleats of each bellow-shaped first gathering portion are folded.

The circular discharge openings 28 of the air bag 12 are placed at a part of the second gathering portions 54.

During the folding process of the first and second gathering portions 51 and 54, the folding height of the air bag 12 is controlled by the height control portion.

Then, with the air bag kept untreated, the folded air bag 12 is wrapped with a wrapping member or covered with the cover member 14. With this, the folding process of the air bag 12 is completed.

That is, the air bag 12 thus folded has such a shape that the four first gathering portions 51 folded like bellows are arranged on the bottom surface 25 around the inlet opening 26 and the four second gathering portions 54 folded like bellows are arranged at peripheral sides of the first gathering portions 51. In each first gathering portion 51, the first cloth 21 and the second cloth 22 are arranged to be suppressed from making a relative meshing, and in each second gathering portion 54, at least the portion that has been held by the line part forming unit 41 along the line "R" is folded like a bellow permitting an imaginary line along which the first and second cloths 21 and 22 are suppressed from making the relative meshing to extend from the center side inlet opening 26 to a peripheral portion of the air bag 12. A front surface portion of the second cloth 22 is restrained by the height control portion, so that actually the front surface portion of the cloth 22 has a single layer, and thus, the front surface portion is constructed by one piece of cloth.

When now an inflation gas is led into the inlet opening 26 of the air bag 12, the air bag 12 is expanded and projected from the cover member 14 after breaking the same. During this, the inflation gas is kept supplied along the imaginary lines, so that the second gathering portions 54 are expanded rapidly advancing toward the peripheral portion, that is, in the advancing direction of bellows, without making an interference therebetween. Furthermore, due to the work of the gas guide portion 30 of the third cloth 23, the inflation gas is led to the peripheral area along the second gathering portions, viz., the lines "R", and thus, a rapid expansion of the second gathering portions 54 to the peripheral side is promoted. Then, the first gathering portions 51 are expanded toward the peripheral side, that is, in the advancing direction of bellows. Since also the first gathering portions 51 have been folded up without making a meshing between the first and second cloths 21 and 22, the gas is smoothly supplied to the peripheral side and thus rapid expansion toward the peripheral side is achieved. Due to the rapid expansion toward the peripheral side thereof, the air bag 12 shows at its initial expansion stage a negative pressure near the front surface portion of the second cloth 22, which controls the projection of the air bag 12 toward the front side. After advancing flatly over an imaginary surface defined by the rim portion of the steering wheel, the air bag 12 is expanded toward the front side assuming a full expansion state. When, under this condition, a passenger wearing a seat belt and taking a normally seated position is thrown or inclined forward, the passenger is effectively restrained by the air bag and thus saved.

Since in the initial inflation stage the expansion of the air bag 12 is forced to advance flatly in the peripheral direction to control the expansion of the air bag 12 at the front side in the initial inflation stage, the pressing force applied to the passenger can be effectively controlled even if the air bag 12 is subjected to expansion under a condition wherein the passenger takes a too near position (viz., out of position (OOP)) relative to the air bag device 1. In particularly, since the second gathering portions 54 are expanded without making mutual meshing therebetween, each second gathering portion 54 is permitted to advance into a clearance between the rim portion of the steering wheel and the boss portion of the same upon the air bag expansion with the passenger placed very near the air bag, and thus the pressure applied to the too near passenger can be effectively reduced.

As is described hereinabove, in the air bag device 1 equipped with the air bag 12 of the present invention, there is no need of turning the air bag 12 in the folding process. That is, according to the invention, a folding device can be produced by assembling members that make only simple movements, and thus, the folding device can be made simple in construction and production cost of it can be reduced.

Furthermore, since the air bag 12 in a folded condition has no portions that are wrapped on one another and all of the portions of the air bag 12 are folded up like bellows, inflation of the bellow like portions is speedily carried out upon expansion of the air bag 12, so that the folding of the air bag 12 shows no substantial resistance against expansion operation of the air bag 12. Furthermore, the cloths 21 and 22 that constitute the air bag 12 are folded up without making mutual meshing therebetween and particularly the portions of the second gathering portions that extend along the imaginary lines are arranged to face each other along the imaginary lines. Accordingly, in the initial inflation stage of the air bag 12, the gas can be smoothly and rapidly led to the peripheral area of the air bag thereby to unfold the air bag toward the peripheral side keeping the flat shape, which prevents the air bag 12 from having an excessively high internal pressure.

The air bag 12 in the folded state has no portions that are wrapped on one another, and thus, upon expansion, the air bag 12 is prevented from suffering a force that is caused by such wrapped arrangement, which assures a reliable expansion of the air bag.

Since every neighboring two of the first gathering portions 51 and every neighboring two of the second gathering portions 54 are each coupled without making mutual meshing therebetween, the expansion of the air bag is smoothly and rapidly carried out without suffering a mutual interference.

Thus, the directional movement of the first and second gathering portions 51 and 54 can be easily controlled, and thus, the expansion of the air bag can be easily achieved by permitting the second gathering portions 54 to move into a clearance between the rim portion of the steering wheel and the both portion of the same avoiding the spoke portion.

Furthermore, since the discharge openings 28 of the air bag 12 are arranged at a portion of the second gathering portions 54, open condition of the discharge openings is assuredly provided after expansion of the second gathering portions 54, and thus, even when the other portions are not expanded, gas discharging through the discharge openings is achieved, which controls increase of the internal pressure of the air bag 12.

Furthermore, in the air bag 12, there is arranged the third cloth 23 that is connected to the first cloth 21 through the stitched connecting portions 29 in a manner to cover the inlet opening 26, so that the inflation gas is guided to flow toward the peripheral side of the air bag along the imaginary lines, viz., the second gathering portions 54. Accordingly, with such simple construction, the gas introduced through the inlet opening 26 can be smoothly fed to desired portions along the imaginary lines causing the air bag to have a desired expansion characteristic wherein expansion of the air bag toward the front side at an initial stage of the expansion is controlled to induce a so-called flat inflation of the air bag.

In the folding process, the front surface portion of the second cloth is stopped by the height control portion, and in the folded condition of the air bag, the front surface potion of the second cloth shows the substantially single layer, and thus, the front surface portion of the second cloth looks like a single cloth. Accordingly, in the most initial stage of the air bag expansion, only a given portion of predetermined side of the air bag is quickly expanded toward the front side and thus it can quickly break the cover member 14, and a continuous expansion of the air bag toward the front side that takes subsequently is controlled, so that the folded portions of the air bag are forced to run toward the outer sides, which brings about a desired air bag expansion characteristic.

Furthermore, as is described hereinabove, the increase of the internal pressure of the air bag is controlled, and thus, even to a passenger who is very close to the air bag device 1, the air bag 12 can exhibit a desired expansion characteristic wherein the internal pressure at the initial expansion is reduced.

Furthermore, as is described hereinabove, because of the unique folding of the air bag, it can exhibit the desired expansion characteristic. Accordingly, the inflator 16 for the air bag does not need a specialized specification, and thus, the production cost of the air bag can be reduced because it does not need of usage of a multi control technique that is used when controlling a plurality of inflators and a plurality of igniters (viz., a multi-squib type).

In the above-mentioned embodiment, the number of the imaginary lines are four, and the first and second gathering portions 51 and 54 are each four in number. Accordingly, it is only necessary to prepare four line part forming units 41, four first press pieces 44 and four second press pieces 45. Thus, as compared with an air bag that has five or more gathering portions, the air bag according to the present invention can reduce its production cost by simplifying the construction of the air bag folding device.

When the number of the line "R", viz., the number of the imaginary line, that is, the number of the second gathering portion 54 is three or more, particularly four or more, the air bag 12 that expands into a circular pillow-shaped member has such desired characteristics that upon expansion, it expands in all directions in a balanced manner showing no directional nature, stabilizes its expanding movement, and realizes the desired expansion characteristic with ease. Furthermore, when the radial and circumferential portions of the second gathering portions 54 are reduced, it is possible to realize an expansion of the air bag wherein upon expansion, each second gathering portion 54 is led into a space between the rim portion of the steering wheel and the boss portion of the same while avoiding the spoke portion.

As is described hereinabove, by providing four lines "R", viz., four imaginary lines, that is, by providing four first gathering portions 51 and four second gathering portions 54, realization of the desired air bag expansion characteristic and reduction of the production cost of the air bag are both achieved.

When four lines, viz., four imaginary lines, and four second gathering portions 54 are provided, folding the air bag 12 by using only the second gathering portions 54 causes each of the folded second gathering portions 54 to have a larger radial size which makes a smoothed bellows-like folding of the air bag 12 difficult. However, by providing additionally the first gathering portions 51 and controlling the size of the second gathering portions 54, the folding of the second gathering portions 54 is easily carried out.

If desired, the number of the lines "R", viz., the imaginary lines, the first gathering portions 51 and the second gathering portions 54 may be five or more.

The portion of each first gathering portion 51 that is pressed by the first press piece 44 dose not always need a folding like the bellows when the number of the second gathering portions 54 is not matched with the above-mentioned number. That is, if desired, a single cloth may extend along a periphery of the bottom surface that has the inlet opening 26.

Figure 4A:
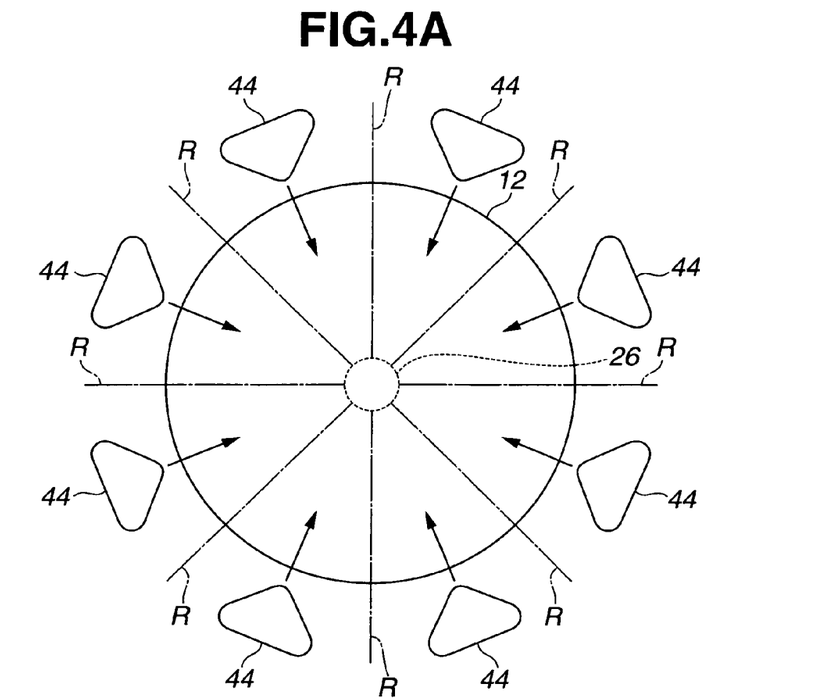
FIG. 4 shows illustrations showing a folding process of an air bag, which is another embodiment of the present invention.
Figure 4B:
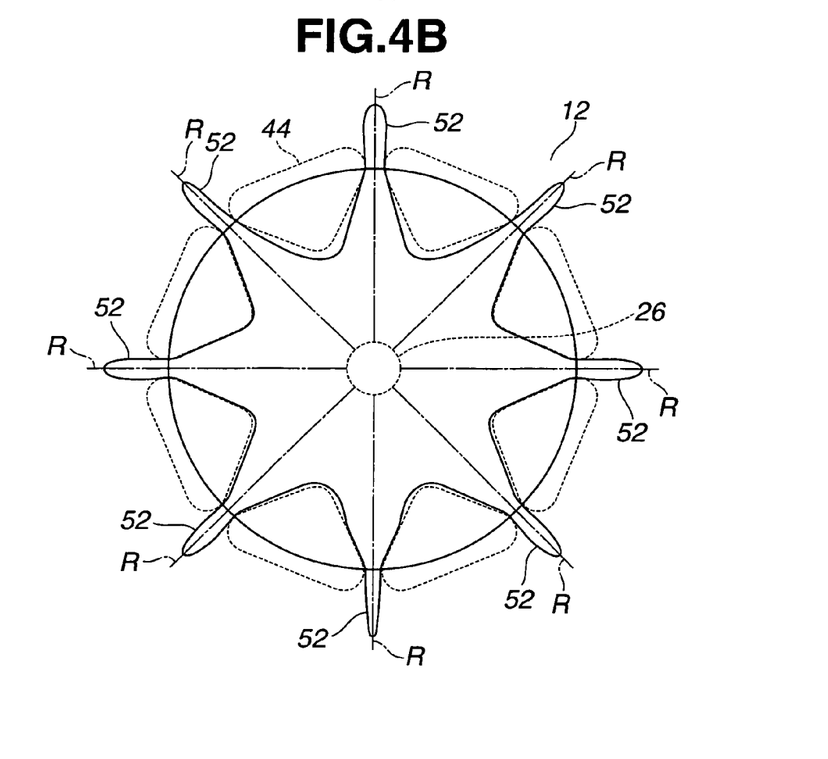
Figure 5:
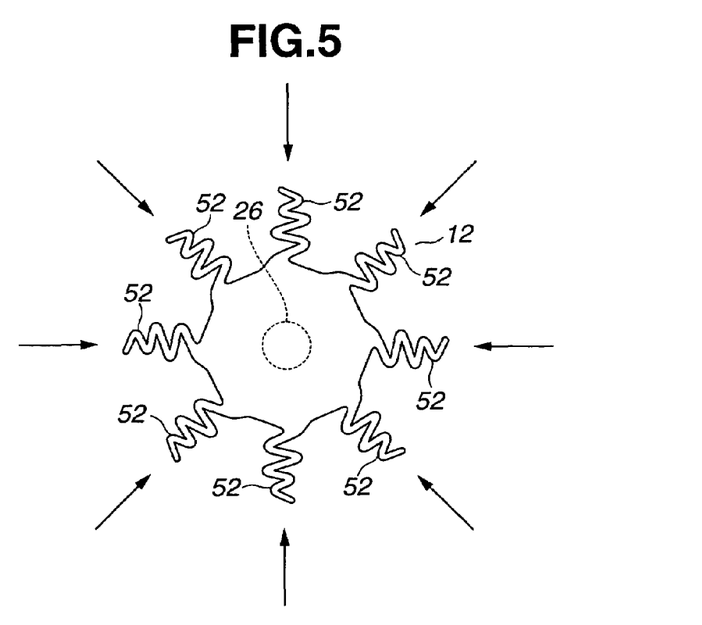
FIG. 5 is an illustration showing the folding process of the air bag of another embodiment.
Figure 6A:
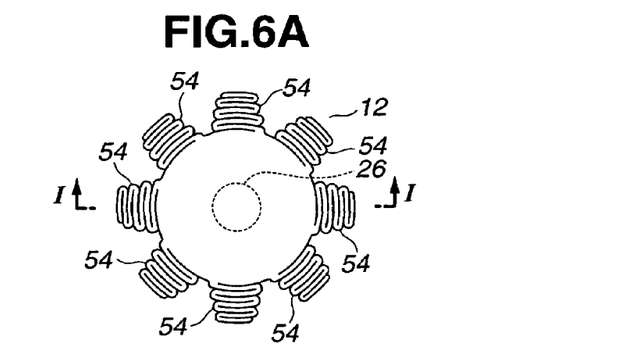
FIG. 6 shows illustrations, (a) being a plan view and (b) being a section view taken along the line I-I of the illustration (a).
Figure 6B:
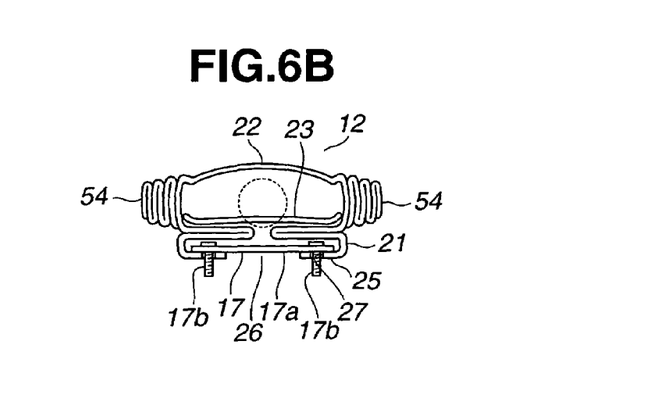

That is, for example, as is seen from FIGS. 4 to 6, a folding method may be provided wherein eight lines "R", that is, eight imaginary lines are set, and eight second gathering portions 54 are provided along the respective imaginary lines, and portions that are pressed by the first press pieces 44 are not portions that are folded like the bellows.

In this folding method, as is seen from FIGS. 4(a) and 4(b), each first press piece 44 is not flat in shape, that is, each press piece 44 has a round head. As is seen from FIG. 4(a), when, with the flat-conditioned air bag 12 held by the line part forming units 41 (not shown) along the lines "R", the eight first press pieces 44 are advanced, each first press piece 44 pushes the cloth as is seen from FIG. 4(b), and thus, eight ear portions 52 are formed. After the line part forming units 41 and the first press pieces 44 are moved to their inoperative positions, eight second press pieces 44 (not shown) are advanced. With this, as is seen from FIG. 5, each ear portion 52 is folded like a bellow and thus the second gathering portions 54 are produced, and as is seen from FIG. 6, an air bag 12 in a folded condition is prepared.

Also in the air bag 12 that is folded in the above-mentioned manner, upon expansion, the gas can be smoothly and quickly led to the leading ends of the second gathering portions 54, and thus, the air bag 12 can be quickly expanded in a desired manner. That is, in an initial stage of the air bag expansion, the force of the air bag directed toward the front side is controlled.

Figure 7:
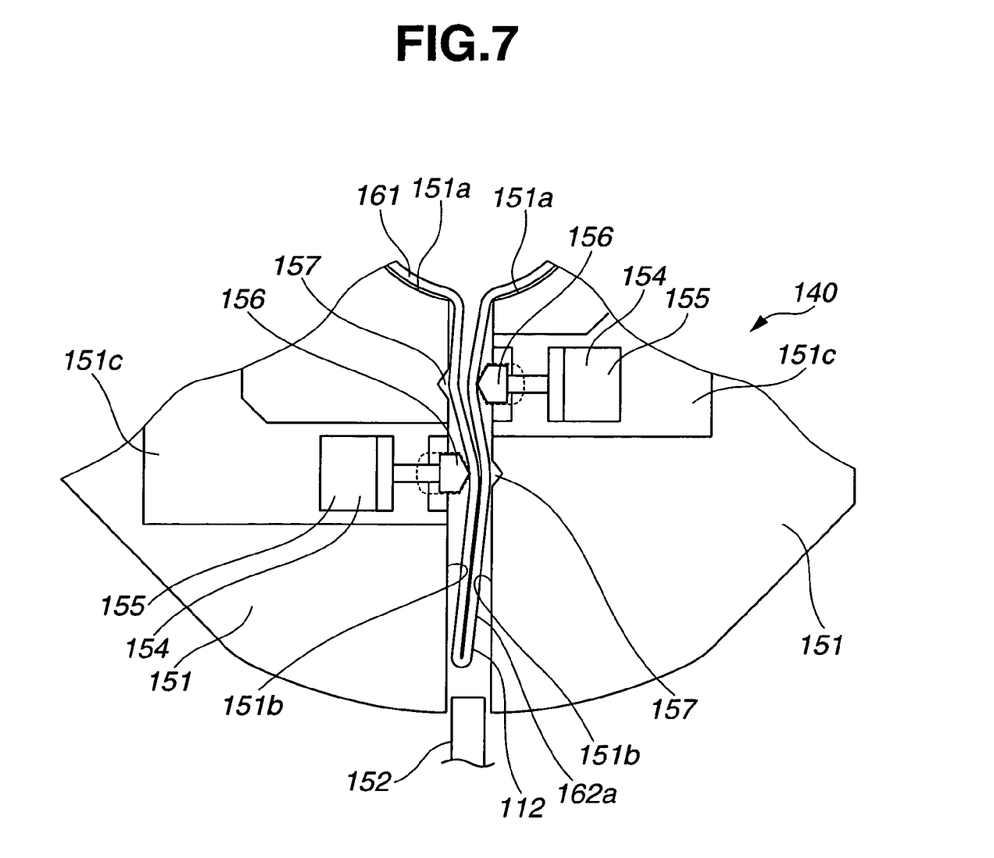
FIG. 7 is an enlarged view of a part of a modification of the air bag of FIG. 1.

FIG. 7 is a partial view of a modification of the embodiment (folding device) of FIG. 1.

The folding device 140 of the modification will be described with reference to FIG. 7.

The folding device 140 is similar to the device shown in FIG. 2 and has, in each first press piece 151 called as a gathering block, a folding helping means 154 which is a feature of the modification.

That is, neighboring two first press pieces 151 are advanced to predetermined positions, so that the air bag 112 takes a temporary shape that is similar to the shape shown by FIG. 1(a). Under this condition, a press piece 156 of each folding helping means 154, which can be called a crossing block, is in a withdrawn position, and each ear portion 52 is received in a passage defined between mutually opposed side surface portions 151b of the neighboring two press pieces 156. Then, as is seen from FIG. 7, the two press pieces 156, that are arranged at radially different positions and constructed to move in opposite directions with respect to the passage, are moved to positions just before receiving portions 157 that are provided in side surface portions 151b of the neighboring first press pieces 151.

Since the two press pieces 156 and 156 and the two receive portions 157 and 157 are advanced alternately from one side of the first press piece to the other side, the ear portion 52 is shaped like a gentle wave. Then, the press pieces 156 are moved to their withdrawn positions and then each second press piece 152 is advanced.

Because of the folding helping given by the press pieces 156, the wave shaped ear portion 52 has a regularity in folding. Thus, the leading end of the ear portion 52 can be bent in a left or right direction selectively and the number of the waves appearing on the ear portion can be controlled. Accordingly, the leading end of the ear portion can be bent in a desired direction, the size irregularity and number irregularity of the waves can be minimized and thus a large-scale production of air bags with a desired expansion characteristic is achieved.

In the afore-mentioned embodiments having the first press pieces 44 (see FIG. 1(a) and FIG. 4(a)), by increasing a space defined between the neighboring two first press pieces 44, the portion that produces the ear portion is increased in size, and by pressing such size-increased portion, undesired irregularity in packing density of the folded up air bag is minimized and thus expansion of the air bag can be easily and smoothly carried out.

If desired, the following measures may be employed. That is, first press pieces 44 or 154 with separatable heads are advanced to predetermined positions and thereafter only the heads are left at the predetermined positions and the major portions of press pieces 44 or 154 are slightly moved back to positions to increase a space defined between mutually opposed first press pieces. Then, by using second press pieces with a size suited to the increased space, the ear portion is pressed.

The number of the waves of the ear portion folded in the increased space is small and thus the density of a portion of the air bag that is pressed is low. Accordingly, the packing density of a corner portion of the air bag that is constitute by gathering the ear portions is moderated, and thus, stress produced when the air bag is expanded is minimized and thus smoothed air bag expansion is expected.

What is claimed is:

1. A method of folding an air bag, the air bag including a first surface portion that is formed with a gas inlet opening through which a gas is introduced and a second surface portion that faces the first surface portion, the method comprising:
    a placement process wherein the airbag is placed in a flat condition on a surface portion;
    a regulating process wherein, along a plurality of radial lines extending from a periphery of the flat air bag to the gas inlet opening and while the air bag is in the flat condition, the first and second surface portions are moved closer together;
    thereafter, a first gathering process wherein portions positioned between the lines are pressed toward the gas inlet opening to form a first gathering portion; and
    thereafter, a second gathering process wherein after completion of the first gathering process, the regulated portions that have been moved closer to each other are pressed toward the gas inlet opening to form a gathering portion around the first gathering portion thereby to constitute a second gathering portion.

2. A method of folding an air bag, the air bag including a first surface portion that has a gas inlet opening and a second surface portion that is arranged to be opposite to the first surface portion, the method comprising:
    a placement process wherein the airbag is placed in a flat condition on a surface portion;
    a regulating process wherein, along a plurality of radial lines extending from a periphery of the flat air bag to the gas inlet opening and while the air bag is in the flat condition, the first and second surface portions are moved closer together;
    thereafter, a first pressing process wherein portions defined between the lines are pressed toward the gas inlet opening; and
    thereafter, a second pressing process wherein after completion of the first pressing process, the regulated portions that have been neared to each other are pressed toward the gas inlet opening thereby to form a bellow-shaped flat gathering portion.

3. A folded air bag comprising:
    a first surface portion that has a gas inlet opening, a second surface portion that is arranged to be opposite to the first surface portion,
    a plurality of first gathering portions that are gathered circumferentially around the gas inlet opening and extend radially from the opening in a manner such that adjacent first gathering portions do not touch one another and are separated by a space along a respective one of a plurality of imaginary lines that extend radially from the gas inlet opening to a peripheral portion of the air bag, and
    a plurality of second gathering portions each respectively disposed in said space between adjacent first gathering portions where the imaginary lines extend such that adjacent second gathering portions do not touch one another and adjacent first and second gathering portions do not wrap upon one another,
    wherein the first surface portion and the second surface portion face each other without touching each other and a portion including a portion extending along the imaginary lines is gathered around the first gathering portion.

4. An air bag as claimed in claim 3, in which the first and second surface portions are folded toward the gas inlet opening without touching each other thereby to form a bellow-shaped flat gathering portion around the gas inlet opening.

5. An air bag as claimed in claim 4, in which the second surface portion has a substantially single layer at a portion that corresponds to a portion of the first surface portion where the gas inlet opening is provided.

6. An air bag as claimed in claim 4, further comprising a circular first cloth that constitutes the first surface portion and has the gas inlet opening, a circular second cloth that constitutes the second surface portion, a third cloth that is arranged between the first and second cloths in a manner to cover the gas inlet opening, a plurality of connecting portions by which the third cloth is connected to the first cloth and gas guiding portions that are each defined between neighboring two connecting portions to guide the inflation gas from the gas inlet opening along said imaginary lines.

7. An air bag as claimed in claim 3, in which the second surface portion has a substantially single layer at a portion that corresponds to a portion of the first surface portion where the gas inlet opening is provided.

8. An air bag as claimed in claim 7, further comprising a circular first cloth that constitutes the first surface portion and has the gas inlet opening, a circular second cloth that constitutes the second surface portion, a third cloth that is arranged between the first and second cloths in a manner to cover the gas inlet opening, a plurality of connecting portions by which the third cloth is connected to the first cloth and gas guiding portions that are each defined between neighboring two connecting portions to guide the inflation gas from the gas inlet opening along said imaginary lines.

9. An air bag as claimed in claim 3, further comprising a circular first cloth that constitutes the first surface portion and has the gas inlet opening, a circular second cloth that constitutes the second surface portion, a third cloth that is arranged between the first and second cloths in a manner to cover the gas inlet opening, a plurality of connecting portions by which the third cloth is connected to the first cloth and gas guiding portions that are each defined between neighboring two connecting portions to guide the inflation gas from the gas inlet opening along said imaginary lines.

10. A folded air bag comprising:
    a first surface portion that has a gas inlet opening and a second surface portion that is arranged to be opposite to the first surface portion;
    a radially folded arrangement comprising a plurality of folded portions, each portion disposed where one of a plurality of respective imaginary lines extends radially from the gas inlet opening to an outer peripheral portion of the folded air bag, wherein the first and second surface portions face each other without touching each other, and wherein each folded portion extending radially along the imaginary lines is gathered without touching any other folded portion and thereby constitutes a bellow-shaped gathering portion.

11. An air bag as claimed in claim 10, in which the first and second surface portions are folded toward the gas inlet opening without touching each other thereby to form a bellow-shaped flat gathering portion around the gas inlet opening.

12. An air bag as claimed in claim 10, in which the second surface portion has a substantially single layer at a portion that corresponds to a portion of the first surface portion where the gas inlet opening is provided.

13. An air bag as claimed in claim 10, further comprising a circular first cloth that constitutes the first surface portion and has the gas inlet opening, a circular second cloth that constitutes the second surface portion, a third cloth that is arranged between the first and second cloths in a manner to cover the gas inlet opening, a plurality of connecting portions by which the third cloth is connected to the first cloth and gas guiding portions that are each defined between neighboring two connecting portions to guide the inflation gas from the gas inlet opening along said imaginary lines.

* * * * *